(12) United States Patent
Chung

(10) Patent No.: US 7,043,517 B2
(45) Date of Patent: May 9, 2006

(54) MULTIPLY ACCUMULATOR FOR TWO N BIT MULTIPLIERS AND AN M BIT ADDEND

(75) Inventor: Chi-jui Chung, Kaohsiung (TW)

(73) Assignee: Faraday Technology Corp., Hsin-Chu (TW)

( * ) Notice: Subject to any disclaimer, the term of this patent is extended or adjusted under 35 U.S.C. 154(b) by 588 days.

(21) Appl. No.: 10/384,428

(22) Filed: Mar. 7, 2003

(65) Prior Publication Data

US 2004/0177104 A1    Sep. 9, 2004

(51) Int. Cl.
*G06F 15/00* (2006.01)
(52) U.S. Cl. .................. 708/523; 708/603; 708/628
(58) Field of Classification Search ............ 708/523, 708/501, 603, 628
See application file for complete search history.

(56) References Cited

U.S. PATENT DOCUMENTS

| | | | | |
|---|---|---|---|---|
| 4,740,906 A | * | 4/1988 | Renner et al. ............ | 708/318 |
| 5,623,683 A | * | 4/1997 | Pandya .................... | 708/625 |
| 5,847,981 A | * | 12/1998 | Kelley et al. ............ | 708/603 |
| 6,542,915 B1 | * | 4/2003 | Dibrino et al. .......... | 708/501 |
| 6,611,856 B1 | * | 8/2003 | Liao et al. ............... | 708/523 |

* cited by examiner

*Primary Examiner*—Chuong D. Ngo
(74) *Attorney, Agent, or Firm*—Winston Hsu

(57) ABSTRACT

A multiply accumulator performs a multiplication-and-addition operation for a first multiplier with N bits, a second multiplier with N bits, and an addend with M bits, wherein M is larger than 2N. The multiply accumulator includes a modified Booth encoder and a multiplication-and-addition unit. The modified Booth encoder performs a Booth encoding to either the first multiplier or its bit inversion by supplementing a multiplier sign bit behind a least significant bit of either the first multiplier or its bit inversion. The multiplication-and-addition unit includes a carry save adder tree and a sign extension adder and achieves a high speed of the multiplication-and-addition operation by simultaneously performing the multiplication and addition.

11 Claims, 4 Drawing Sheets

| $X_{2i+1}$ | $X_{2i}$ | $X_{2i-1}$ | Encoding Value |
|---|---|---|---|
| 0 | 0 | 0 | 0 |
| 0 | 0 | 1 | 1 |
| 0 | 1 | 0 | 1 |
| 0 | 1 | 1 | 2 |
| 1 | 0 | 0 | -2 |
| 1 | 0 | 1 | -1 |
| 1 | 1 | 0 | -1 |
| 1 | 1 | 1 | 0 |
Fig. 3(a)
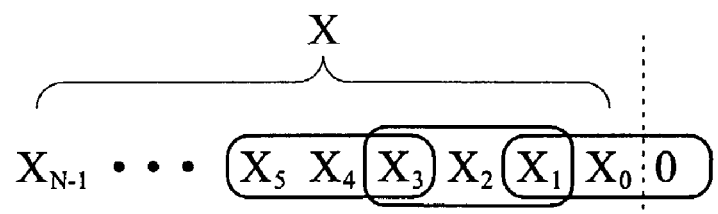
Fig. 3(b)
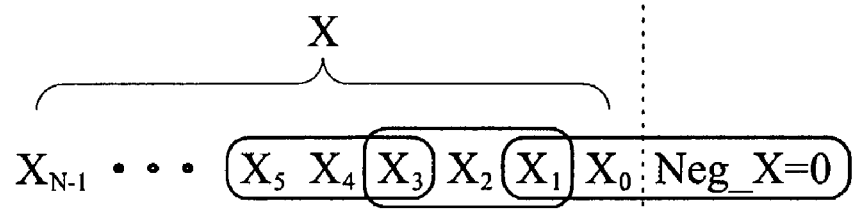
Fig. 3(c)
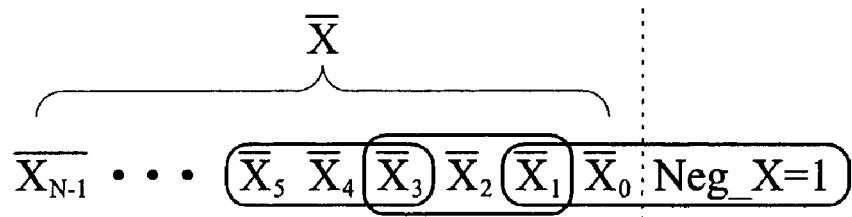
Fig. 3(d)

| C1 | C2 | Conditional Addend |
|---|---|---|
| 0 | 0 | -1 |
| 0 | 1 | 0 |
| 1 | 0 | 0 |
| 1 | 1 | 1 |

MULTIPLY ACCUMULATOR FOR TWO N BIT MULTIPLIERS AND AN M BIT ADDEND

BACKGROUND OF THE INVENTION

1. Field of the Invention

The present invention relates to a multiply accumulator (MAC) and, more particularly, to a multiply accumulator for two N bit multipliers and an M bit addend, in which M is larger than 2N. The multiply accumulator according to the present invention achieves a high speed operation by simultaneously performing multiplication and addition.

2. Description of the Related Art

Typically, digital electronic products are equipped with microprocessors for performing logical operations and arithmetical operations with respect to digital signals. The arithmetical operation of the digital signals normally includes a series of multiplications and accumulations (or referred to as additions), which are carried out by means of a multiply accumulator. FIGS. 1(a) and 1(b) are schematic diagrams showing two examples of configurations of conventional multiply accumulators for performing a multiplication-and-addition operation X·Y+A. In this operation, the two multipliers X and Y as well as the addend A are all digital signals consisting of a plurality of bits, such as 16 or 32 bits. Also, the symbol · indicates a multiplication while the symbol + indicates an addition.

Referring to FIG. 1(a), a conventional multiply accumulator 1 includes a carry save adder tree 10 and an adder 11. First, the two multipliers X and Y are input into the carry save adder tree 10 for performing the multiplication X·Y by accumulation of partial products. Typically, the carry save adder tree 10 has a configuration of a plurality of adders (not shown) interconnected as a tree structure for performing the accumulation of the partial products of the multipliers X and Y. After completing the multiplication X·Y, the carry save adder tree 10 outputs a final product into the adder 11 for performing the addition with respect to the addend A. Therefore, the arithmetical multiplication-and-addition operation X·Y+A is completed.

Another conventional multiply accumulator 2 shown in FIG. 1(b) has a configuration different from that shown in FIG. 1(a) in that the conventional multiply accumulator 2 further includes a Booth encoder 12. As shown in FIG. 1(b), the multipliers X and Y are input into the carry save adder tree 10 through the Booth encoder 12'. With the Booth encoder 12, the realization of the multiplication X·Y has become easier in the carry save adder tree 10, thereby raising the overall processing speed of the arithmetical multiplication-and-addition operation X·Y+A.

Along with a growing demand for a microprocessor with a better performance, it is necessary to raise the operating speed of the multiply accumulator employed in the microprocessor. Both of the conventional multiply accumulators 1 and 2 shown in FIGS. 1(a) and 1(b) perform the multiplication and the addition in such two separate steps that the addition does not be carried out until the completion of the multiplication. As a result, the overall operating speed of the conventional multiply accumulators 1 and 2 are inevitably restrained from optimization since the addend remains idle before the addition can be performed.

SUMMARY OF THE INVENTION

In view of the above-mentioned problem, an object of the present invention is to provide a multiply accumulator for two N bit multipliers and an M bit addend, in which M is larger than 2N, capable of achieving a high speed operation by simultaneously performing multiplication and addition through accumulating partial products and addend in a common step.

According to one aspect of the present invention, a multiply accumulator receives a first multiplier with N bits, a second multiplier with N bits, and an addend with M bits, in which M being larger than 2N. The multiply accumulator includes a modified Booth encoder and a multiplication-and-addition unit. The multiplication-and-addition unit includes a carry save adder tree and a sign extension conditional adder.

When a multiplier sign bit has a first bit value, the modified Booth encoder performs a Booth encoding for a bit inversion of the first multiplier by supplementing the multiplier sign bit behind a least significant bit of the bit inversion of the first multiplier. The multiplication-and-addition unit performs a multiplication-and-addition operation of the Booth encoded bit inversion of the first multiplier, the second multiplier, and the addend. The carry save adder tree performs an accumulation of partial products of the Booth encoded bit inversion of the first multiplier and the second multiplier and least significant (2N+1) bits of the addend to generate two carry bits. The sign extension conditional adder performs operations of: adding most significant (M−2N−1) bits of the addend with −1 when both of the two carry bits are 0; making the most significant (M−2N−1) bits of the addend unchanged when the two carry bits are 0 and 1, respectively; and adding the most significant (M−2N−1) bits of the addend with 1 when both of the two carry bits are 1.

When the multiplier sign bit has a second bit value, the modified Booth encoder performs a Booth encoding for the first multiplier by supplementing the multiplier sign bit behind a least significant bit of the first multiplier. The multiplication-and-addition unit performs a multiplication-and-addition operation of the Booth encoded first multiplier, the second multiplier, and the addend. The carry save adder tree performs an accumulation of partial products of the Booth encoded first multiplier and the second multiplier and least significant (2N+1) bits of the addend to generate two carry bits.

Preferably, the multiply accumulator according to the present may further include a multiplier sign selection unit for outputting the bit inversion of the first multiplier to the modified Booth encoder when the multiplier sign bit has the first bit value and outputting the first multiplier to the modified Booth encoder when the multiplier sign bit has the second bit value.

Preferably, the first bit value may be 1 while the second bit value may be 0.

BRIEF DESCRIPTION OF THE DRAWINGS

The above-mentioned and other objects, features, and advantages of the present invention will become apparent with reference to the following descriptions and accompanying drawings, wherein:

FIGS. 3(a) and 3(b) show a conventional Booth encoding table and part of a conventional Booth encoding procedure, respectively;

FIGS. 3(c) and 3(d) show part of a modified Booth encoding procedure in a modified Booth encoder according to the present invention;

DETAILED DESCRIPTION OF THE PREFERRED EMBODIMENTS

The preferred embodiments according to the present invention will be described in detail with reference to the drawings.

Figure 1A:
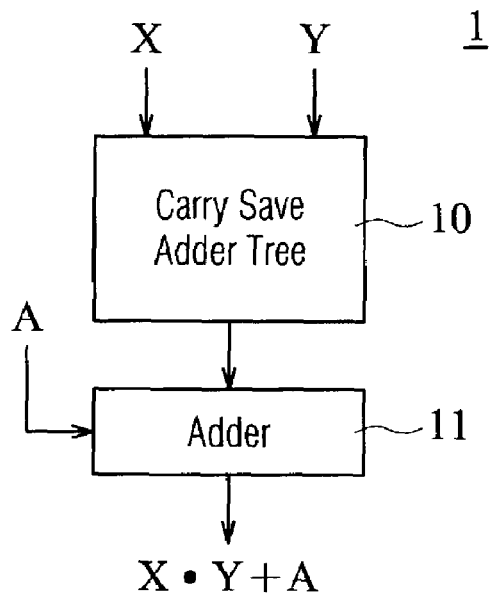
FIGS. 1(a) and 1(b) are schematic diagrams showing two examples of configurations of conventional multiply accumulators for performing a multiplication-and-addition operation X·Y+A.
Figure 1B:
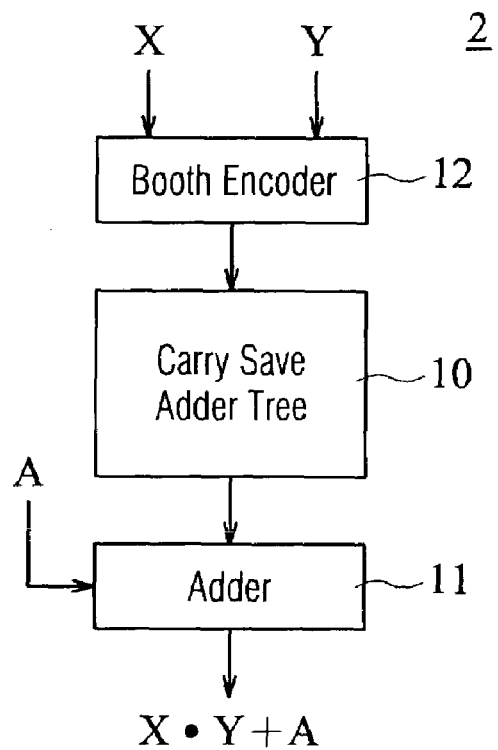
Figure 2:
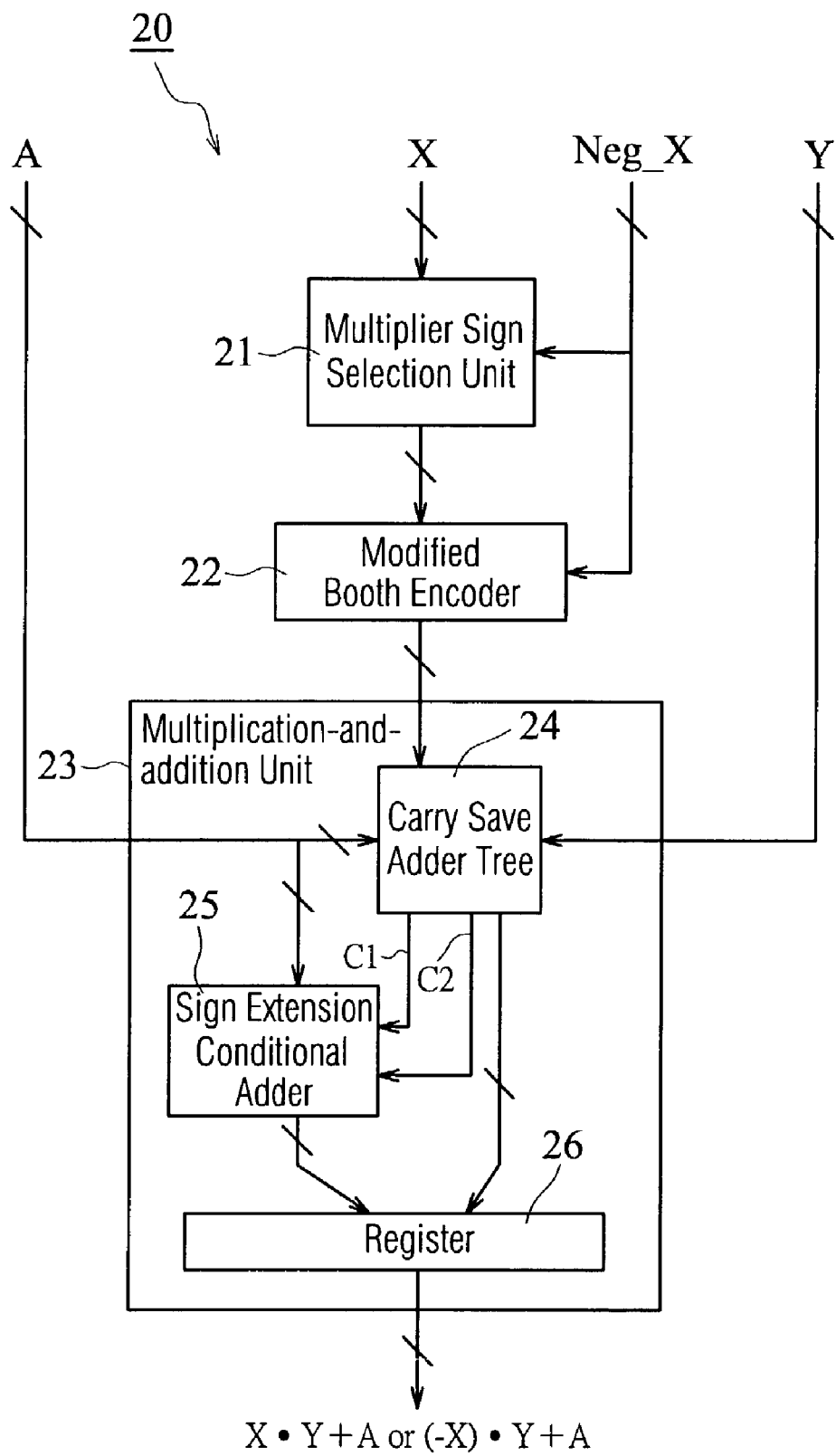
FIG. 2 is a schematic circuit block diagram showing a multiply accumulator according to the present invention.

FIG. 2 is a schematic circuit block diagram showing a multiply accumulator 20 according to the present invention. The multiply accumulator 20 is applied for two N bit multipliers and an M bit addend, in which M is larger than 2N. Referring to FIG. 2, the multiply accumulator 20 includes a multiplier sign selection unit 21, a modified Booth encoder 22, and a multiplication-and-addition unit 23. The multiply accumulator 20 is designed to perform multiplication-and-addition operations X·Y+A and (−X)·Y+A, in which each of X and Y is an N bit multiplier and A is an M bit addend. More specifically, the multiply accumulator 20 receives a multiplier sign bit Neg_X as a selection signal, which is input to the multiplier sign selection unit 21, in order to perform either X·Y+A or (−X)·Y+A depending on which one of X and $\overline{X}$ is selected. Here, $\overline{X}$ represents a bit inversion of X, which is a well-known notation. For example, $\overline{X}$ is "1010110" given that X is "0101001". The multiplier sign selection unit 21 may be an Exclusive-OR gate such that X is selected when Neg_X=0, thereby performing the operation X·Y+A, and $\overline{X}$ is selected when Neg_X=1, thereby performing the operation (−X)·Y+A.

FIG. 3(a) shows a conventional Booth encoding table. Referring to FIG. 3(a), $X_{2i+1}$, $X_{2i}$, and $X_{2i-1}$ represent a (2i+1)-th bit, a (2i)-th bit, and a (2i−1)-th bit of the multiplier X, respectively, and the rightmost column indicates the corresponding Booth encoding values. FIG. 3(b) shows part of a conventional Booth encoding procedure. Referring to FIG. 3(b), the N bits of the multiplier X are represented by reference symbols $X_{N-1}$, . . . , $X_5$, $X_4$, $X_3$, $X_2$, $X_1$, and $X_0$, respectively, where $X_{N-1}$ indicates a most significant bit and $X_0$ indicates a least significant bit. During the conventional Booth encoding procedure, a bit of "0" is supplemented behind the least significant bit $X_0$ and then a Booth encoding step associated with $X_1$, $X_0$, and 0 is performed with reference to the Booth encoding table of FIG. 3(a).

Now considered is to perform the operation (−X)·Y+A. Conventionally, it is necessary to calculate (−X) from X at first and then to perform the Booth encoding for (−X). For a 2-complement format, (−X) may be calculated by bit-inverting X and then adding a value of 1 to the bit inversion of X, i.e. (−X)=$\overline{X}$+1. Since the step of "adding a value of 1" in order to obtain (−X) is time-consumptive, the operation speed of the conventional multiply accumulator is inevitably restrained.

FIGS. 3(c) and 3(d) show part of a modified Booth encoding procedure according to the present invention. In the multiply accumulator 20, the multiplier sign bit Neg_X is input to the modified Booth encoder 22 for serving as a supplement bit applied behind the least significant bit during the Booth encoding procedure. As shown in FIG. 3(c), the operation X·Y+A is performed when Neg_X=0 and therefore the multiplier X is Booth encoded. In this case, a bit of "0" is supplemented behind the least significant bit $X_0$, which is the same as the step shown in FIG. 3(b). However, the operation (−X)·Y+A is performed when Neg_X=1. In this case, the modified Booth encoder 22 causes $\overline{X}$ instead of X to be Booth encoded. Furthermore, a bit of "1" instead of "0" is supplemented behind the least significant bit $\overline{X}_0$, as shown in FIG. 3(d). From the conventional Booth encoding table of FIG. 3(a), it is appreciated that the Booth encoding by supplementing a bit of "1" behind the least significant bit $\overline{X}_0$ provides the same effect as the Booth encoding of ($\overline{X}$+1), i.e. the Booth encoding of (−X). Accordingly, the step of "adding a value of 1" has been automatically incorporated into the Booth encoding procedure and needs not to be carried out separately, thereby raising the operation speed of the multiply accumulator 20 according to the present invention.

Figures 4, 5:
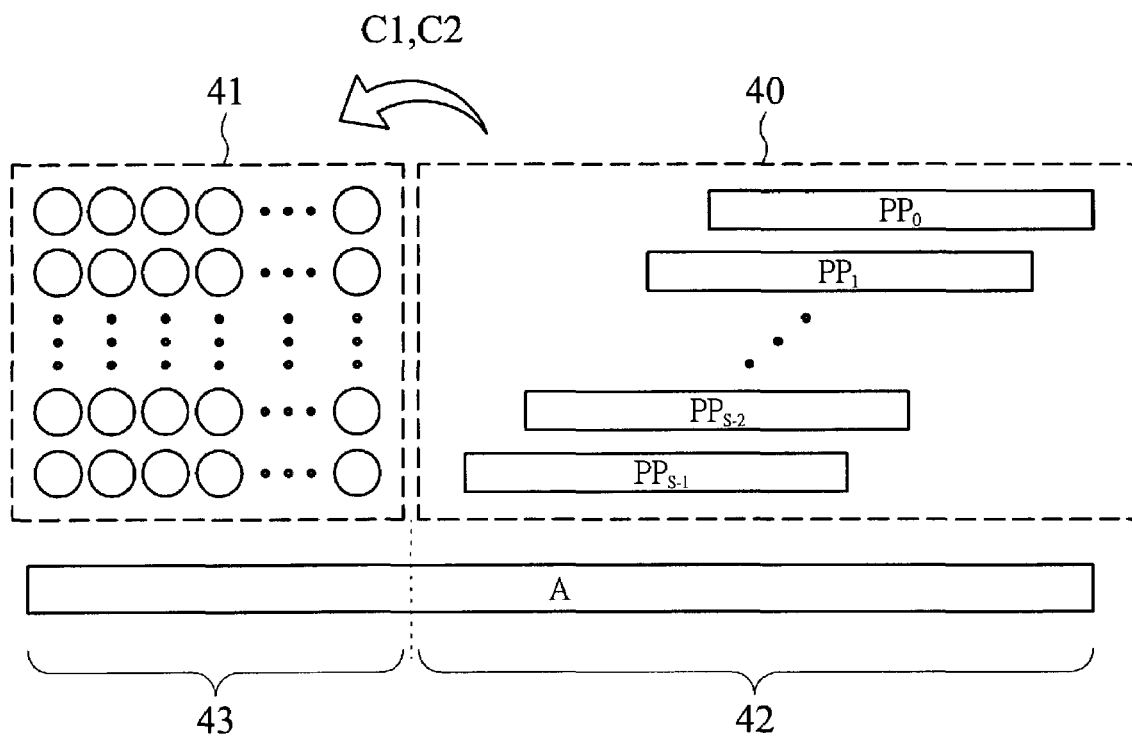
FIG. 4 shows a bit position relationship between partial products and an addend in a multiplication-and-addition unit.
FIG. 5 shows an operation table of a sign extension conditional adder according to the present invention.

In order to further increase the operation speed, the multiplication-and-addition unit 23 of the multiply accumulator 20 is designed to simultaneously perform the multiplication and addition. FIG. 4 shows a bit position relationship between partial products and an addend in the multiplication-and-addition unit 23. In a partial product array region 40 surrounded by a dashed line of FIG. 4, reference symbols $PP_0$, $PP_1$, . . . , $PP_{S-2}$, and $PP_{S-1}$ represent a partial product array of the two N bit multipliers X (or (−X)) and Y. Since the bit number M of the addend A is larger than the bit number N of each of the multipliers X (or (−X)) and Y, it is necessary to supplement an appropriate number of sign extension bits in order to simultaneously perform the accumulation of the partial product array and the addend A. In a sign extension region 41 surrounded by another dashed line of FIG. 4, each of circles represents a sign extension bit. Correspondingly, all bits of the addend A may be divided into two segments: a bit segment 42 corresponding to the partial product array region 40 and a bit segment 43 corresponding to the sign extension region 41. The bit segment 42 contains the least significant (2N+1) bits of the addend A while the bit segment 43 contains the most significant (M−2N−1) bits of the addend A.

The accumulation of the partial product array region 40 and the bit segment 42 may be carried out by a carry save adder tree 24, as shown in FIG. 3. After the accumulation of the partial product array region 40 and the bit segment 42 is completed, two carry bits C1 and C2 are generated and sent for the accumulation of the sign extension region 41 and the bit segment 43. More specifically, the carry bit C1 is generated from the accumulation of all of the most significant bits in every row of the partial product array region 40 and the most significant bit of the bit segment 42. The carry bit C2 represents a most significant carry bit generated from the accumulation of a carry bit row and a sum bit row obtained by a reduction of the partial product array region 40 and the bit segment 42 through the carry save adder tree 24.

With respect to the accumulation of the sign extension sign 41, the bit segment 43, and the two carry bits C1 and C2, the inventor has developed a sign extension conditional adder 25 for installing in the multiplication-and-addition unit 23 according to the present invention in order to significantly simplify the necessary accumulation. More specifically, the inventor has recognized that the accumulation of the sign extension 41 and the two carry bits C1 and C2 can be simplified by providing a conditional addend having a value determined by a combination of the two carry bits C1 and C2. As a result, the accumulation of the sign extension region 41, the bit segment 43, and the two carry bits C1 and C2 is simplified into an accumulation of the bit segment 43 and the conditional addend.

FIG. 5 shows an operation table of the sign extension conditional adder 25 according to the present invention. Referring to FIG. 5, in a case where the carry bit combination (C1, C2) corresponds to (0, 0), the conditional addend has a value of −1. In another case where the carry bit combination (C1, C2) corresponds to either (0, 1) or (1, 0), the conditional addend has a value of 0. In still another case of the carry bit combination (C1, C2) corresponds to (1, 1), the conditional addend has a value of 1. Therefore, with the operation table of FIG. 5, the sign extension conditional adder 25 according to the present invention can easily complete the accumulation of the sign extension region 41, the bit segment 43, and the two carry bits C1 and C2 by adding the bit segment 43 with a value of −1, 0, or 1 depending on the carry bit combination (C1, C2), thereby significantly reducing the operative complexity and enhancing the operation speed.

Referring back to FIG. 2, the results obtained from the operations performed by the carry save adder tree 24 and the sign extension conditional adder 25 are incorporated within a register 26 as a final result of the multiplication-and-addition operation X·Y+A or (−X)·Y+A.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A multiply accumulator for receiving a first multiplier with N bits, a second multiplier with N bits, and an addend with M bits, M being larger than 2N, the multiply accumulator comprising:
    a modified Booth encoder for receiving a multiplier sign bit, and performing a Booth encoding for a bit inversion of the first multiplier by supplementing the multiplier sign bit behind a least significant bit of the bit inversion of the first multiplier when the multiplier sign bit has a first bit value, and
    a multiplication-and-addition unit for performing a multiplication-and-addition operation of the Booth encoded bit inversion of the first multiplier, the second multiplier, and the addend when the multiplier sign bit has the first bit value, the multiplication-and-addition unit including:
    a carry save adder tree for performing an accumulation of partial products of the Booth encoded bit inversion of the first multiplier and the second multiplier and least significant (2N+1) bits of the addend to generate two carry bits when the multiplier sign bit has the first bit value; and
    a sign extension conditional adder for performing operations of:
        adding most significant (M−2N−1) bits of the addend with −1 when both of the two carry bits are 0;
        making the most significant (M−2N−1) bits of the addend unchanged when the two carry bits are 0 and 1, respectively; and
        adding the most significant (M−2N−1) bits of the addend with 1 when both of the two carry bits are 1.

2. The multiply accumulator according to claim 1, wherein the first bit value is 1.

3. The multiply accumulator according to claim 1, further comprising:
    a multiplier sign selection unit for outputting the bit inversion of the first multiplier to the modified Booth encoder when the multiplier sign bit has the first bit value.

4. The multiply accumulator according to claim 3, wherein the multiplier sign selection unit is composed of an Exclusive-OR gate.

5. The multiply accumulator according to claim 1, wherein the modified Booth encoder performs a Booth encoding for the first multiplier by supplementing the multiplier sign bit behind a least significant bit of the first multiplier when the multiplier sign bit has a second bit value.

6. The multiply accumulator according to claim 1, wherein the multiplication-and-addition unit performs a multiplication-and-addition operation of the Booth encoded first multiplier, the second multiplier, and the addend when the multiplier sign bit has the second bit value.

7. The multiply accumulator according to claim 6, wherein the carry save adder tree performs an accumulation of partial products of the Booth encoded first multiplier and the second multiplier and the least significant (2N+1) bits of the addend to generate two carry bits when the multiplier sign bit has the second bit value.

8. The multiply accumulator according to claim 5, wherein the second bit value is 0.

9. The multiply accumulator according to claim 5, further comprising:
    a multiplier sign selection unit for outputting the first multiplier to the modified Booth encoder when the multiplier sign bit has the second bit value.

10. The multiply accumulator according to claim 9, wherein the multiplier sign selection unit is composed of an Exclusive-OR gate.

11. The multiply accumulator according to claim 1, wherein the multiplication-and-addition unit further comprises a register for incorporating the results generated from the carry save adder tree and the sign extension conditional adder.

* * * * *